(12) United States Patent
Murphy et al.

(10) Patent No.: US 7,912,982 B2
(45) Date of Patent: Mar. 22, 2011

(54) WIRELESS ROUTING SELECTION SYSTEM AND METHOD

(75) Inventors: James Murphy, Pleasanton, CA (US); Gary Morain, San Jose, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 1112 days.

(21) Appl. No.: 11/604,075

(22) Filed: Nov. 22, 2006

(65) Prior Publication Data

US 2008/0117822 A1    May 22, 2008

Related U.S. Application Data

(60) Provisional application No. 60/812,403, filed on Jun. 9, 2006.

(51) Int. Cl.
*G06F 15/173* (2006.01)
*H04W 40/00* (2009.01)

(52) U.S. Cl. .................................. 709/238; 455/445

(58) Field of Classification Search .......... 709/238–242; 370/238; 455/428, 445
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRoas et al. |
| 4,247,908 A | 1/1981 | Lockart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah et al. |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |

(Continued)

FOREIGN PATENT DOCUMENTS

WO    WO 94/03986    2/1994

(Continued)

OTHER PUBLICATIONS

Co-pending U.S. Appl. No. 10/778,901, filed Feb. 13, 2004.

(Continued)

*Primary Examiner* — Asad M Nawaz
*Assistant Examiner* — Sargon N Nano

(57) ABSTRACT

A technique involves untethered access points (UAPs) that can broadcast estimated transmission time (ETT) that represents an estimated time it would take for a packet to be transmitted from the first UAP to an AP that is wire coupled to a network. The proposed system can offer, among other advantages, accurate ETT values for use by UAPs of a wireless network.

5 Claims, 9 Drawing Sheets

U.S. PATENT DOCUMENTS

| | | |
|---|---|---|
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | McRae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,715,304 A * | 2/1998 | Nishida et al. ........... 379/114.02 |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,875,179 A | 2/1999 | Tikalsky |
| 5,887,259 A | 3/1999 | Zicker et al. |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,999,813 A * | 12/1999 | Lu et al. ...................... 455/435.2 |
| 6,005,853 A | 12/1999 | Wang et al. |
| 6,011,784 A | 1/2000 | Brown |
| 6,041,240 A | 3/2000 | McCarthy et al. |
| 6,078,568 A | 6/2000 | Wright |
| 6,088,591 A | 7/2000 | Trompower |
| 6,101,539 A | 8/2000 | Kennelly et al. |
| 6,118,771 A | 9/2000 | Tajika et al. |
| 6,119,009 A | 9/2000 | Baranger et al. |
| 6,160,804 A | 12/2000 | Ahmed et al. |
| 6,188,694 B1 | 2/2001 | Fine et al. |
| 6,199,032 B1 | 3/2001 | Anderson |
| 6,208,629 B1 | 3/2001 | Jaszewki et al. |
| 6,208,841 B1 | 3/2001 | Wallace et al. |
| 6,212,395 B1 * | 4/2001 | Lu et al. ........................ 455/463 |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,262,988 B1 | 7/2001 | Vig |
| 6,285,662 B1 | 9/2001 | Watannabe |
| 6,304,596 B1 | 10/2001 | Yamano et al. |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ulfongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,535,732 B1 * | 3/2003 | McIntosh et al. ............. 455/445 |
| 6,580,700 B1 | 6/2003 | Pinard et al. |
| 6,587,680 B1 | 7/2003 | Ata-Laurila et al. |
| 6,614,787 B1 | 9/2003 | Jain et al. |
| 6,624,762 B1 | 9/2003 | End, III |
| 6,625,454 B1 | 9/2003 | Rappaport et al. |
| 6,631,267 B1 | 10/2003 | Clarkson |
| 6,659,947 B1 | 12/2003 | Carter |
| 6,661,787 B1 | 12/2003 | O'Connell |
| 6,687,498 B2 | 2/2004 | McKenna et al. |
| 6,697,415 B1 | 2/2004 | Mahany |
| 6,725,260 B1 | 4/2004 | Philyaw |
| 6,747,961 B1 | 6/2004 | Ahmed et al. |
| 6,760,324 B1 | 7/2004 | Scott et al. |
| 6,785,275 B1 | 8/2004 | Boivie et al. |
| 6,839,338 B1 | 1/2005 | Amara et al. |
| 6,839,348 B2 | 1/2005 | Tang et al. |
| 6,879,812 B2 | 4/2005 | Agrawal |
| 6,957,067 B1 | 10/2005 | Iyer et al. |
| 6,973,622 B1 | 12/2005 | Rappaport et al. |
| 6,978,301 B2 | 12/2005 | Tindal |
| 6,996,630 B1 * | 2/2006 | Masaki et al. ................. 709/239 |
| 7,020,438 B2 | 3/2006 | Sinivaara et al. |
| 7,020,773 B1 | 3/2006 | Otway et al. |
| 7,024,199 B1 * | 4/2006 | Massie et al. ................. 455/445 |
| 7,024,394 B1 | 4/2006 | Ashour et al. |
| 7,027,773 B1 * | 4/2006 | McMillin ...................... 455/41.2 |
| 7,062,566 B2 | 6/2006 | Amara et al. |
| 7,068,999 B2 | 6/2006 | Ballai |
| 7,089,322 B1 * | 8/2006 | Stallmann ...................... 709/238 |
| 7,110,756 B2 | 9/2006 | Diener |
| 7,116,979 B2 | 10/2006 | Backes et al. |
| 7,146,166 B2 | 12/2006 | Backes et al. |
| 7,155,518 B2 | 12/2006 | Forslow |
| 7,221,927 B2 | 5/2007 | Kolar et al. |
| 7,224,970 B2 | 5/2007 | Smith et al. |
| 7,263,366 B2 | 8/2007 | Miyashita |
| 7,280,495 B1 | 10/2007 | Zweig et al. |
| 7,317,914 B2 | 1/2008 | Adya et al. |
| 7,324,468 B2 | 1/2008 | Fischer |
| 7,324,487 B2 | 1/2008 | Saito |
| 7,359,676 B2 | 4/2008 | Hrastar |
| 7,370,362 B2 | 5/2008 | Olson et al. |
| 7,376,080 B1 | 5/2008 | Riddle et al. |
| 7,421,248 B1 | 9/2008 | Laux et al. |
| 7,466,678 B2 | 12/2008 | Cromer et al. |
| 7,489,648 B2 | 2/2009 | Griswold |
| 7,509,096 B2 | 3/2009 | Palm et al. |
| 7,529,925 B2 | 5/2009 | Harkins |
| 7,551,619 B2 | 6/2009 | Tiwari |
| 7,570,656 B2 | 8/2009 | Raphaeli et al. |
| 7,573,859 B2 | 8/2009 | Taylor |
| 7,577,453 B2 | 8/2009 | Matta |
| 7,724,704 B2 | 5/2010 | Simons et al. |
| 2001/0024953 A1 | 9/2001 | Balogh |
| 2002/0052205 A1 | 5/2002 | Belostofsky et al. |
| 2002/0060995 A1 | 5/2002 | Cervello et al. |
| 2002/0069278 A1 | 6/2002 | Forslow |
| 2002/0095486 A1 | 7/2002 | Bahl |
| 2002/0101868 A1 | 8/2002 | Clear et al. |

| | | |
|---|---|---|
| 2002/0176437 A1 | 11/2002 | Busch et al. |
| 2002/0191572 A1 | 12/2002 | Weinstein et al. |
| 2003/0014646 A1 | 1/2003 | Buddhikot et al. |
| 2003/0018889 A1 | 1/2003 | Burnett et al. |
| 2003/0055959 A1 | 3/2003 | Sato |
| 2003/0107590 A1 | 6/2003 | Levillain et al. |
| 2003/0134642 A1 | 7/2003 | Kostic et al. |
| 2003/0135762 A1 | 7/2003 | Macaulay |
| 2003/0174706 A1 | 9/2003 | Shankar et al. |
| 2003/0227934 A1 | 12/2003 | White et al. |
| 2004/0003285 A1 | 1/2004 | Whelan et al. |
| 2004/0019857 A1 | 1/2004 | Teig et al. |
| 2004/0025044 A1 | 2/2004 | Day |
| 2004/0047320 A1 | 3/2004 | Eglin |
| 2004/0053632 A1 | 3/2004 | Nikkelen et al. |
| 2004/0062267 A1 | 4/2004 | Minami et al. |
| 2004/0064560 A1 | 4/2004 | Zhang et al. |
| 2004/0068668 A1 | 4/2004 | Lor et al. |
| 2004/0095914 A1 | 5/2004 | Katsube et al. |
| 2004/0095932 A1 | 5/2004 | Astarabadi et al. |
| 2004/0120370 A1 | 6/2004 | Lupo |
| 2004/0143428 A1 | 7/2004 | Rappaport et al. |
| 2004/0165545 A1 | 8/2004 | Cook |
| 2004/0208570 A1 | 10/2004 | Reader |
| 2004/0221042 A1 | 11/2004 | Meier |
| 2004/0230370 A1 | 11/2004 | Tzamaloukas |
| 2004/0236702 A1 | 11/2004 | Fink et al. |
| 2004/0255167 A1 | 12/2004 | Knight |
| 2004/0259555 A1 | 12/2004 | Rappaport et al. |
| 2005/0030929 A1 | 2/2005 | Swier et al. |
| 2005/0037818 A1 | 2/2005 | Seshadri et al. |
| 2005/0054326 A1 | 3/2005 | Rogers |
| 2005/0058132 A1 | 3/2005 | Okano et al. |
| 2005/0059405 A1 | 3/2005 | Thomson |
| 2005/0059406 A1 | 3/2005 | Thomson et al. |
| 2005/0064873 A1 | 3/2005 | Karaoguz et al. |
| 2005/0068925 A1 | 3/2005 | Palm |
| 2005/0073980 A1 | 4/2005 | Thomson et al. |
| 2005/0097618 A1 | 5/2005 | Arling et al. |
| 2005/0122977 A1 | 6/2005 | Lieberman |
| 2005/0128989 A1 | 6/2005 | Bhagwat et al. |
| 2005/0157730 A1 | 7/2005 | Grant et al. |
| 2005/0180358 A1 | 8/2005 | Kolar et al. |
| 2005/0181805 A1 | 8/2005 | Gallagher |
| 2005/0193103 A1 | 9/2005 | Drabik |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0245269 A1 | 11/2005 | Demirhan et al. |
| 2005/0259597 A1 | 11/2005 | Benedetotto et al. |
| 2005/0276218 A1 | 12/2005 | Ooghe et al. |
| 2006/0045050 A1 | 3/2006 | Floros et al. |
| 2006/0104224 A1 | 5/2006 | Singh et al. |
| 2006/0128415 A1 | 6/2006 | Horikoshi et al. |
| 2006/0161983 A1 | 7/2006 | Cothrell et al. |
| 2006/0174336 A1 | 8/2006 | Chen |
| 2006/0189311 A1 | 8/2006 | Cromer et al. |
| 2006/0200862 A1 | 9/2006 | Olson et al. |
| 2006/0245393 A1 | 11/2006 | Bajic |
| 2006/0248331 A1 | 11/2006 | Harkins |
| 2006/0276192 A1 | 12/2006 | Dutta et al. |
| 2007/0025265 A1 | 2/2007 | Porras et al. |
| 2007/0064718 A1 | 3/2007 | Ekl et al. |
| 2007/0070937 A1 | 3/2007 | Demirhan et al. |
| 2007/0083924 A1 | 4/2007 | Lu |
| 2007/0086378 A1 | 4/2007 | Matta et al. |
| 2007/0091889 A1 | 4/2007 | Xiao et al. |
| 2007/0189222 A1 | 8/2007 | Kolar et al. |
| 2007/0260720 A1 | 11/2007 | Morain |
| 2008/0002588 A1* | 1/2008 | McCaughan et al. ......... 370/238 |
| 2008/0008117 A1 | 1/2008 | Alizadeh-Shabdiz |
| 2008/0013481 A1 | 1/2008 | Simons et al. |
| 2008/0056200 A1 | 3/2008 | Johnson |
| 2008/0056211 A1 | 3/2008 | Kim et al. |
| 2008/0096575 A1 | 4/2008 | Aragon et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0151844 A1 | 6/2008 | Tiwari |
| 2008/0162921 A1 | 7/2008 | Chesnutt et al. |
| 2009/0031044 A1 | 1/2009 | Barrack et al. |
| 2009/0198999 A1 | 8/2009 | Harkins |

FOREIGN PATENT DOCUMENTS

| | | |
|---|---|---|
| WO | WO 99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,073, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/330,877, filed Jan. 11, 2006.
Co-pending U.S. Appl. No. 11/351,104, filed Feb. 8, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 12/491,201, filed Jun. 24, 2009.
Co-pending U.S. Appl. No. 11/417,830, filed May 3, 2006.
Co-pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 12/489,295, filed Jun. 22, 2009.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 11/975,134, filed Oct. 16, 2007.
Co-pending U.S. Appl. No. 11/966,912, filed Dec. 28, 2007.
Co-pending U.S. Appl. No. 12/131,028, filed May 3, 2008.
Co-pending U.S. Appl. No. 12/336,492, filed Dec. 16, 2008.
Notice of Allowance Mailed Feb. 26, 2007 in Co-pending U.S. Appl. No. 10/778,901, filed Feb. 13, 2004.
Non-Final Office Action Mailed Sep. 22, 2009 in Co-pending U.S. Appl. No. 11/784,307, filed Apr. 5, 2007.
Notice of Allowance Mailed Feb. 27, 2009 in Co-pending U.S. Appl. No. 11/377,859, filed Mar. 15, 2006.
Final Office action Mailed Aug. 27, 2008 in Co-pending U.S. Appl. No. 11/377,859, filed Mar. 15, 2006.
Non-Final Office Action Mailed Jan. 8, 2008 in Co-pending U.S. Appl. No. 11/377,859, filed Mar. 15, 2006.
Notice of Allowance Mailed Jun. 11, 2009 in Co-pending U.S. Appl. No. 11/326,966, filed Jan. 5, 2006.
Non-Final Office Action Mailed Nov. 10, 2008 in Co-pending U.S. Appl. No. 11/326,966, filed Jan. 5, 2006.
Non-Final Office Action Mailed Aug. 6, 2009 in Co-pending U.S. Appl. No. 11/330,877, filed Jan. 11, 2006.
Final Office Action Mailed Mar. 13, 2009 in Co-pending U.S. Appl. No. 11/330,877, filed Jan. 11, 2006.
Non-Final Office Action Mailed Sep. 11, 2008 in Co-pending U.S. Appl. No. 11/330,877, filed Jan. 11, 2006.
Non-Final Office Action Mailed Dec. 2, 2009 in Co-pending U.S. Appl. No. 11/351,104, filed Feb. 8, 2006.
Final Office Action Mailed Jun. 10, 2009 in Co-pending U.S. Appl. No. 11/351,104, filed Feb. 8, 2006.
Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.
Final Office Action Mailed Oct. 23, 2008 in Co-pending U.S. Appl. No. 11/331,789, filed Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.
Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.

Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/592,891, filed Nov. 3, 2006.
Non-Final Office Action Mailed Jan. 14, 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
Notice of Allowance Mailed Mar. 19, 2010, in Co-pending U.S. Appl. No. 11/487,722, filed Jul. 17, 2006.
International Search Report PCT/US05/004702 dated Aug. 10, 2006, pp. 1-3.
Written Opinion PCT/US05/004702 dated Aug. 10, 2006, pp. 1-5.
International Search Report PCT/US06/09525 dated Sep. 13, 2007, pp. 1-2.
Written Opinion PCT/US06/09525, dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Search Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.
Written Opinion PCT/US07/089134 dated Apr. 10, 2008, pp. 10-4.
U.S. Appl. No. 11/326,966, filed Jan. 2006, Taylor.
U.S. Appl. No. 11/330,877, filed Jan. 2006, Matta.
U.S. Appl. No. 11/331,789, filed Jan. 2006, Matta, et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Acampora and Winters, IEEE Communications Magazine, 25(8):11-20 (1987).
Acampora and Winters, IEEE Journal on selected Areas in Communications. *SAC-5*:796-804 (1987).
Bing and Subramanian, IEEE, 1318-1322 (1997).

Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the $13^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
Puttini, R., Percher, J., Me, L., and de Sousa, R. 2004. A fully distributed IDS for MANET. In *Proceedings of the Ninth international Symposium on Computers and Communications 2004* vol. 2 (*Iscc04*)—vol. 02 (Jun. 28-Jul. 1, 2004). ISCC. IEEE Computer Society, Washington, DC, 331-338.
Final Office Action mailed Apr. 22, 2010, in Co-pending U.S. Appl. No. 11/330,877, filed Jan. 11, 2006.
Non-Final Office Action Mailed May 3, 2010, in Co-pending U.S. Appl. No. 11/604,075, filed Nov. 22, 2006.
Co-pending U.S. Appl. No. 12/763,057, filed Apr. 19, 2010.
Co-pending U.S. Appl. No. 12/785,362, filed May 21, 2010.
LAN/MAN Standards Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 801.11b (1999).
Okamoto and Xu, IEEE, Proceedings of the 13th Annual Hawaii International Conference on System Sciences, pp. 54-63 (1997).

* cited by examiner

WIRELESS ROUTING SELECTION SYSTEM AND METHOD

This application claims priority to U.S. Provisional Patent Application No. 60/812,403, filed Jun. 9, 2006, and entitled WIRELESS NETWORK ARCHITECTURE, which application is hereby incorporated by reference.

BACKGROUND

Next hop selection in a wireless protocol is made by selecting a least cost hop. Historically, cost has been determined by hop count, signal strength, error rate, utilization, and other factors. One technique for wireless routing selection involves defining cost based on expected transmission time (ETT) for some link (ETTl).

For example, link cost may be determined by measuring the transmission time to send a 1 Mbps stream of packets across the link and measuring its transmission time for some number of bytes. An algorithm may measure for each available bandwidth across the link, and the transmission time is defined as the time from when the packet is scheduled (specifically, sent to the radio) and the time that an acknowledgement is received.

The improvement of algorithms for next hop selection are the subject of research. Any improvements may have significant repercussions on the relevant technologies. Accordingly, any improvement in next hop selection would be advantageous.

These are but a subset of the problems and issues associated with wireless routing selection, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A wireless network system is typically coupled to a wired network at some point. Such a point is sometimes referred to as an access point (AP). A plurality of untethered APs (UAPs) may be coupled to one another, and eventually to the AP, to allow a wireless network to grow to practically any size. However, as the network grows in size using UAPs, it becomes more difficult to figure out a best path from a mobile station, through the UAPs to the AP in an optimal fashion.

Advantageously, UAPs can broadcast estimated transmission time (ETT) that represents an estimated time it would take for a packet to be transmitted from the first UAP to the AP. Thus, a UAP that is right next to the AP should be able to give a low ETT to the AP. As the advertised ETTs percolate through the wireless network, UAPs can eventually settle on optimal paths to the AP. The better the estimate, the more likely the optimally chosen paths are actually optimal.

The proposed system can offer, among other advantages, accurate ETT values for use by UAPs of a wireless network. This and other advantages of the techniques described herein will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
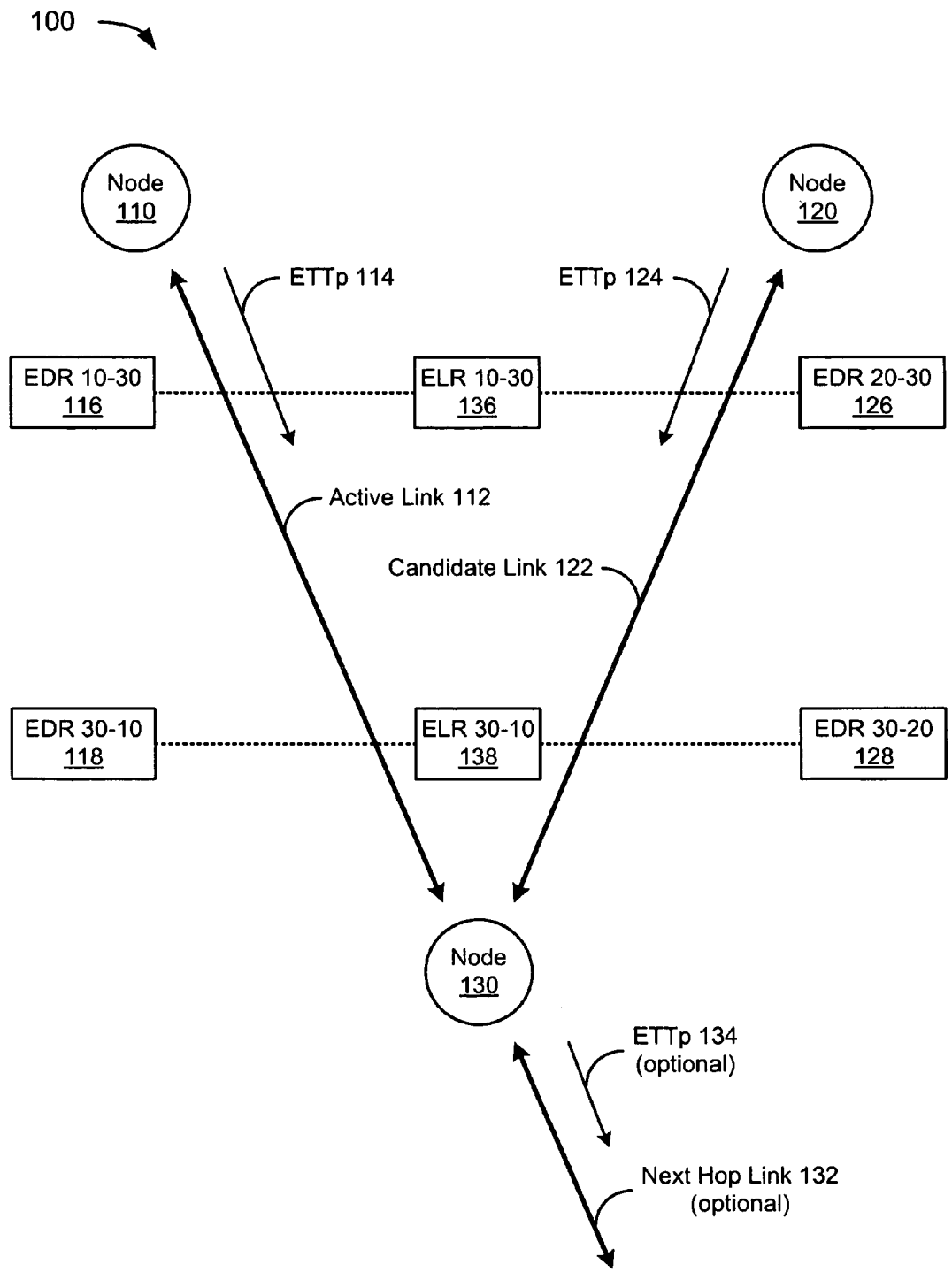
FIG. 1 depicts an example of a rate aware wireless system.

FIG. 1 depicts an example of a rate aware wireless system 100. In the example of FIG. 1, the system 100 includes a node 110, a node 120, and a node 130. For illustrative purposes, the node 110 and the node 130 are currently linked via active link 112, while the node 120 and the node 130 are not currently linked, as represented by the candidate link 122. In an embodiment, the candidate link 122 is periodically measured to determine if it is a better route than the active link 112. Optionally, if the node 130 is a next hop from a source node to a destination node, the node 130 may be linked to another node (not shown) through a next hop link 132.

In the example of FIG. 1, the node 110 advertises an estimated transmission time (ETT) for the path (ETTp) to a destination. ETTp 114 is the sum of ETT for each link (ETTl) from the source (e.g., the node 110) to the destination (not shown). ETTp 124 is the sum of ETTl from the source (e.g., the node 120) to the destination (not shown). Optionally, the node 130 advertises an ETTp 134 that is the ETTp from the node 130 to the destination (passing through either the node 110 or the node 120). ETTp 134 is optional because it will only exist if the node 130 is a next hop node.

Figure 2:
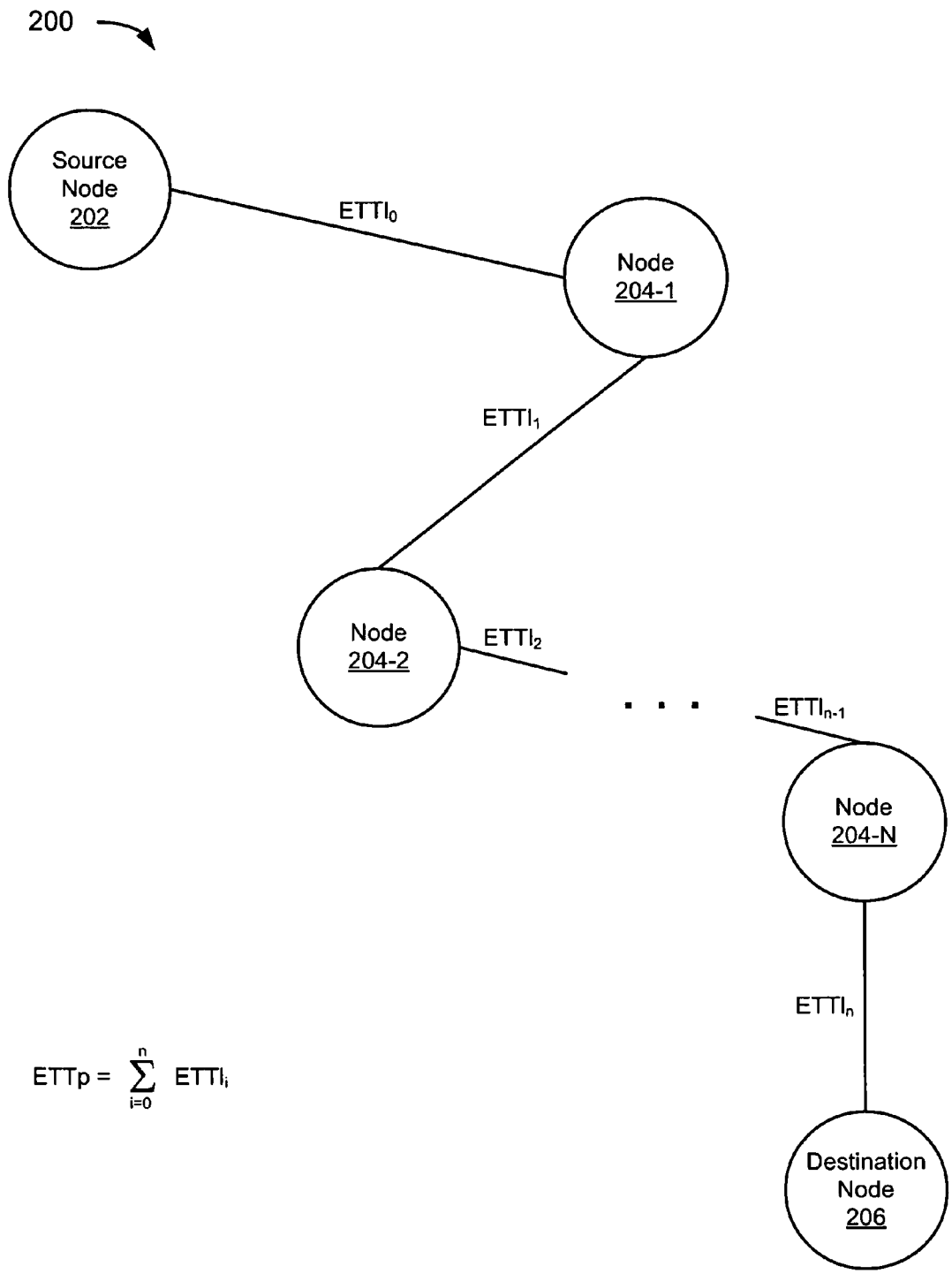
FIG. 2 depicts an example of a weighted graph of source, next hop, and destination nodes.

FIG. 2 depicts an example of a weighted graph 200 of source, next hop, and destination nodes. The weights of the edges in the graph 200 are ETTl between two nodes of the graph 200. ETTp is the sum of ETTl from a source node 202 to a destination node 206. Typically, there are multiple next hop nodes 204-1 to 204-N (referred to collectively as nodes 204) between the source node 202 and the destination node 206, though it is possible to have none. As is shown in FIG. 2, the ETTl from the source node 202 to the node 204-1 has an ETTl$_0$. In general each of the nodes 204 has an ETTlx to the next hop, where x=the ordinal position of the current node. For example, the ETTl$_1$ is the ETTl from the node 204-1 to the node 204-2. As another example, the ETTl$_N$ is the ETTl from the node 204-N to the destination node 206.

In some embodiments, the ETTp calculation is for the time a packet is sent from a radio until the time an acknowledgement is received. This, however, does not include time spent on a queue waiting for the radio to become available. Advantageously, by including the time spent on the queue, the ETTp calculation can take into consideration the real time it takes to transmit a packet based on load and utilization.

Figure 3:
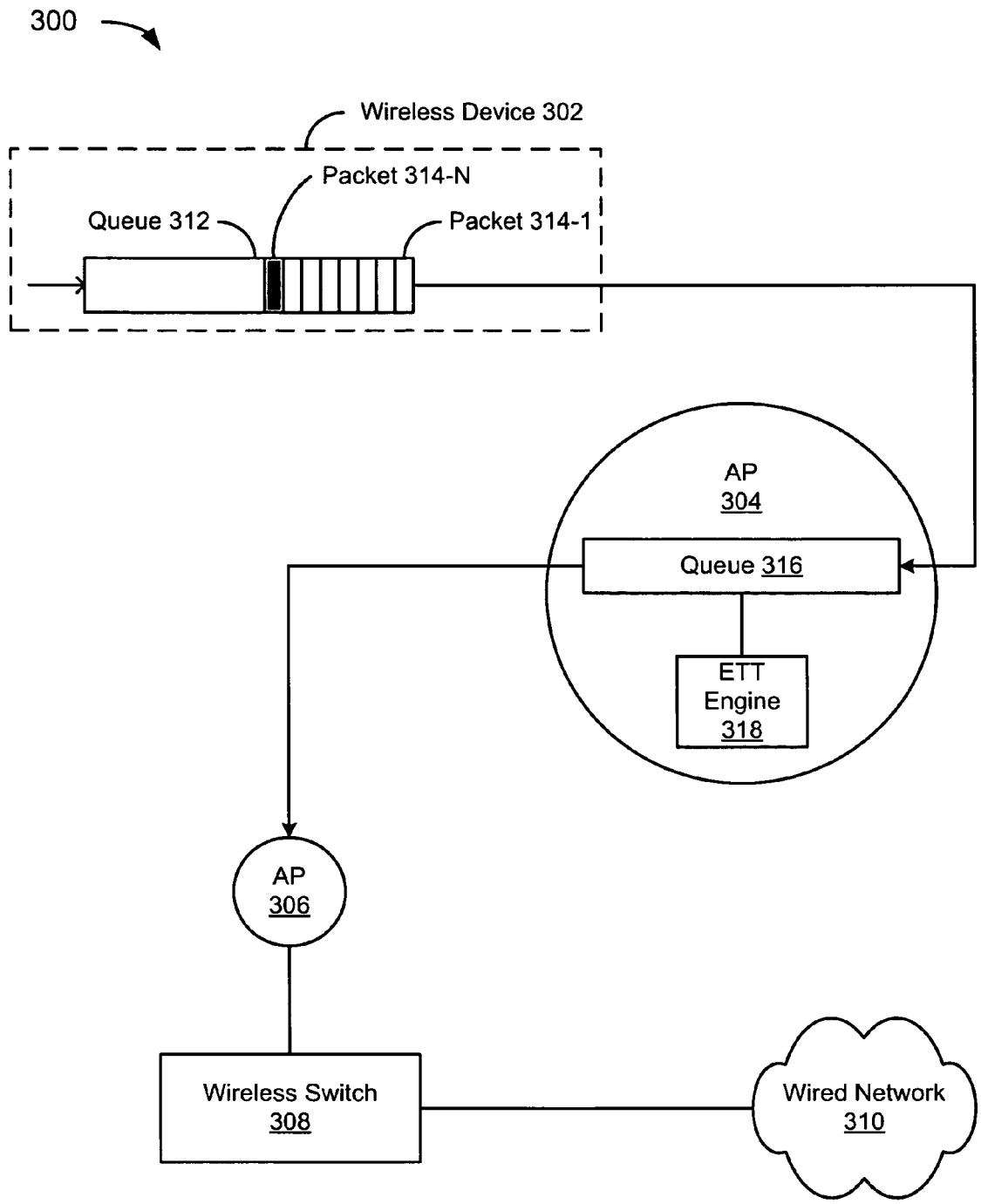
FIG. 3 depicts an example of a system in which an ETTp calculation includes time spent on an output queue.

FIG. 3 depicts an example of a system 300 in which an ETTp calculation includes time spent on an output queue. In the example of FIG. 3, the system 300 includes a wireless device 302, an access point (AP) 304, and an AP 306, a wireless switch 308, and a wired network 310. It may be noted that the AP 304 is depicted as an untethered AP. In an embodiment, any number of untethered APs could be coupled together to reach the tethered AP 306.

In the example of FIG. 3, the wireless device 302 includes a queue 312, with packets 314-1 to 314-N enqueued thereon. The packet 314-1 is presumably a first packet of a stream of packets tha the wireless device 302 is trying to send to the AP 304. However, the AP 304 may not be available, which results in the packet being enqueued in the queue 312, as shown. The packet 314-N is the last packet to be enqueued prior to the packet 314-1 finally being sent to the AP 304. Thus, the example of FIG. 3 illustrates the queue 312 just before the packet 314-1 is sent to the AP 304 (and dequeued). The time spent waiting may be referred to as radio availability latency because it measures the time it takes for a radio (at the AP 304, in this case) to become available.

The AP 304 has a comparable queue 316, which is coupled to an ETT engine 318. The wireless device 302 may or may not have an ETT engine to determine how long a packet is enqueued on the queue 312, but in the example of FIG. 1, no such engine is present at the wireless device 302. The queue 316 functions in a manner quite similar to that described with reference to the queue 312. At the AP 304, however, the ETT engine 318 actually measures the amount of time a packet is enqueued. This radio availability latency can be added to an advertised ETTp, as described later with reference to FIG. 1, to give a more accurate measure of ETT for a packet.

Advantageously, ETT can be used by a next hop selector to decide upon an optimal next hop. In an embodiment, each AP includes a next hop selector.

Figure 4:
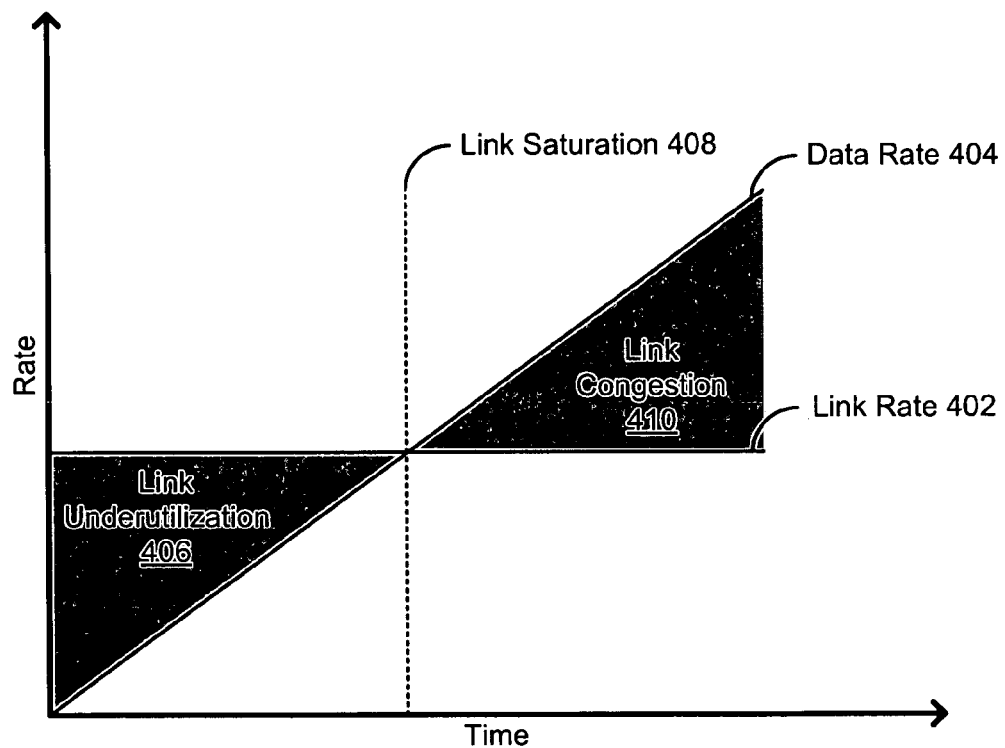
FIG. 4 depicts a graph that provides a conceptual depiction of queue latency.

FIG. 4 depicts a graph 400 that provides a conceptual depiction of queue latency. In the example of FIG. 4, the graph 400 includes (for illustrative purposes) a flat, or static, link rate 402 and a data rate 404 that increases over time. Where the link rate 402 is greater than the data rate 404, the link is under-utilized, as shown by the shaded link underutilization portion 406 of the graph 400. The link saturation point 408 is at a time where the link rate 402 and the data rate 404 are the same. At the link saturation point 408, the link is fully utilized. Where the link rate 402 is less than the data rate 404, the link is congested, as shown by the shaded link congestion portion 410 of the graph 410. When the link is congested, packets will arrive at an output queue, such as the queue 316 (FIG. 3) at a rate that is greater than the rate at which the packets are dequeued (and transmitted). Thus, the time spent waiting on the queue will grow as the link grows more congested. Advantageously, an ETT engine, such as the ETT engine 318 (FIG. 3) can measure this time spent waiting and incorporate the measurement into an ETT calculation.

From "A Radio Aware Routing Protocol for Wireless Mesh Networks" by Kulkarni et al. defines cost based on ETTl, and how ETTl can be aggregated to determine ETTp. However, the algorithm used by Kulkarni et al. can be improved in some specific cases. For example, the choice of 1 Mbps load rate for link cost calculation is arbitrary and may be significantly off. In an embodiment, expected load rate (ELR) is used instead. ELR is the load that a link would be subject to if it was selected as a next-hop.

Referring once again to the example of FIG. 1, an ELR 10-30 136 and an ELR 30-10 138 are associated with the active link 112. The ELR 10-30 136 is intended to illustrate ELR from the node 110 to the node 130 and the ELR 30-10 138 is intended to illustrate ELR from the node 130 to the node 110. In an embodiment, the ETT of a link will vary greatly depending on how much traffic is inserted into it. The more traffic you insert into a link, the higher the probability for collisions on the link. Accordingly, the ELR 10-30 136 is calculated dynamically based on current load conditions of the active link 112 from the node 110 to the node 130, and the ELR 30-10 138 is calculated dynamically based on current load conditions of the active link 112 from the node 130 to the node 110. The calculated ELR may be averaged in an exponentially decaying fashion to allow route selection stabilization.

In the example of FIG. 1, conceptually, the node 130 is trying to select the least cost link to some destination reachable through both the node 110 and the node 120. As shown in the system 100, the active link 112 has an ELR 10-30 136 and an ELR 30-10 138. The ELR 10-30 136 and the ELR 30-10 138 can be used to respectively calculate an effective data rate (EDR) 10-30 116 and an EDR 30-10 118.

EDR is the rate determined by a rate selection algorithm. In general, the rate selection algorithm should meet the following goals: 1) To the extent possible, the selected rate should produce optimal throughput of packets transmitted to a client. This is not necessarily the same thing as minimizing retries. For instance, retransmitting one time a large packet at 54 Mbps may result in better throughput than transmitting the same large packet at a 1 Mbps with no retries. 2) To the extent possible, the algorithm should be computationally light. That is, it should not consume a lot of CPU time to determine a rate to use.

An example of a rate selection algorithm is as follows (though any applicable known or convenient rate selection algorithm could be used): The rate selection algorithm seeks to minimize retransmissions. For each client it maintains a 'best rate' value. The rate selection algorithm is a control system that lowers the best rate when the rate of retransmissions exceeds 50% and raises the best rate when the rate of retransmissions is less than 50%. For each transmitted packet, there are one of three possible outcomes. 1) The packet is successfully transmitted with no retransmissions, 2) the packet is successfully transmitted with one or more retransmissions, 3) the packet transmission is unsuccessful after all retransmission attempts.

For each client, a counter is maintained. When a packet is successfully transmitted with no retransmissions, this counter is incremented by 3. When a packet is successfully transmitted but with retransmissions, the counter is decremented by 6. When a packet is not successfully transmitted, the counter is not changed. When the counter reached a value of −50, then the next lower rate is made the best rate. When the counter reaches a value of 100, the next higher rate is used as the best rate; however, the best rate is not increased if it has been increased in the past 60 seconds. This prevents the best rate from increasing too fast.

For each packet, transmissions are attempted using up to four rates.

The best rate is tried 1 time. This is the initial transmission attempt, not a retransmission.

The next best rate is tried for configured number of retransmissions minus 2. For example, the default value for the retry count is 5, and so by default the next best rate is tried 3 times.

The next lower rate is tried 1 time.

The lowest rate supported by the radio is tried 1 time.

This rate fall back schedule has the following properties. 1) If the best rate is successful, then there are no retries and the client's counter is increased. 2) If the best rate fails, then the next lower rate is used multiple times. The range of the next best rate is better than the best rate, and so the next best rate has a higher probability of success. The client's counter will be decremented in this case to reflect that the best rate was unsuccessful. 3) The radio's lowest rate has the best range, and so if it fails, then the client is not reachable or the failure is due to factors not related to distance. In this case, the client's counter is unchanged because the failure is not related to rate.

If the EDR is actually determined ELR, the algorithm further reduces the bandwidth required to compute ETTl, since the EDR need not be calculated through synthesized load. Notably, as shown in FIG. 1, the EDR 20-30 126 uses the ELR 10-30 136, and the EDR 30-20 128 uses the ELR 30-10 138. Accordingly, for the candidate link 122 as well, a synthesized load is not used. Advantageously, in both cases, ELR is calculated based on existing traffic.

It should be noted that sensing all data rates is less efficient than using the techniques described herein. Advantageously, by using EDR, all possible rates need not be tested, making this technique more efficient. Moreover, selected rates may not be the rate actually selected by a radio transmission module. For example, if data rate selection does not yield an answer that matches an algorithm such as Kulkarni's, the actual ETTl will be different than the expected ETTl and the algorithm will make suboptimal decisions. So using EDR can lead to performance improvements as well.

In an embodiment, the ETTp calculation can be improved by considering the amount of time a packet spends being processed in intermediate nodes. This is the time it takes to receive a packet on some interface and queue it on its egress interface. This time is referred to as node transit time (NTT). Therefore, in a non-limiting embodiment, ETTp=ETTl+ETTp_nh +NTT, where ETTl is the link between a node and a next hop node, ETTp_nh is the ETTp advertised by the next hop node (e.g., the best advertised ETTp of potential next hop nodes), and NTT is the time a packet spends transiting a node. As was previously described, the ETT calculations include the time a packet spends in a queue waiting for a radio to become available. Conceptually, the NTT is the time a packet spends in a node waiting to be enqueued.

The techniques described herein work best when there are relatively few interesting destinations. Advantageously, this is exactly the case in most IP network environments. Most hosts are trying to communicate to their next hop IP router, which is typically eventually accessed over a wired network. Hence, the techniques described herein help answer the question "how do I get to the wired network?" Only a single destination need be evaluated and only a single value to ELR needs to be maintained.

Figure 5:
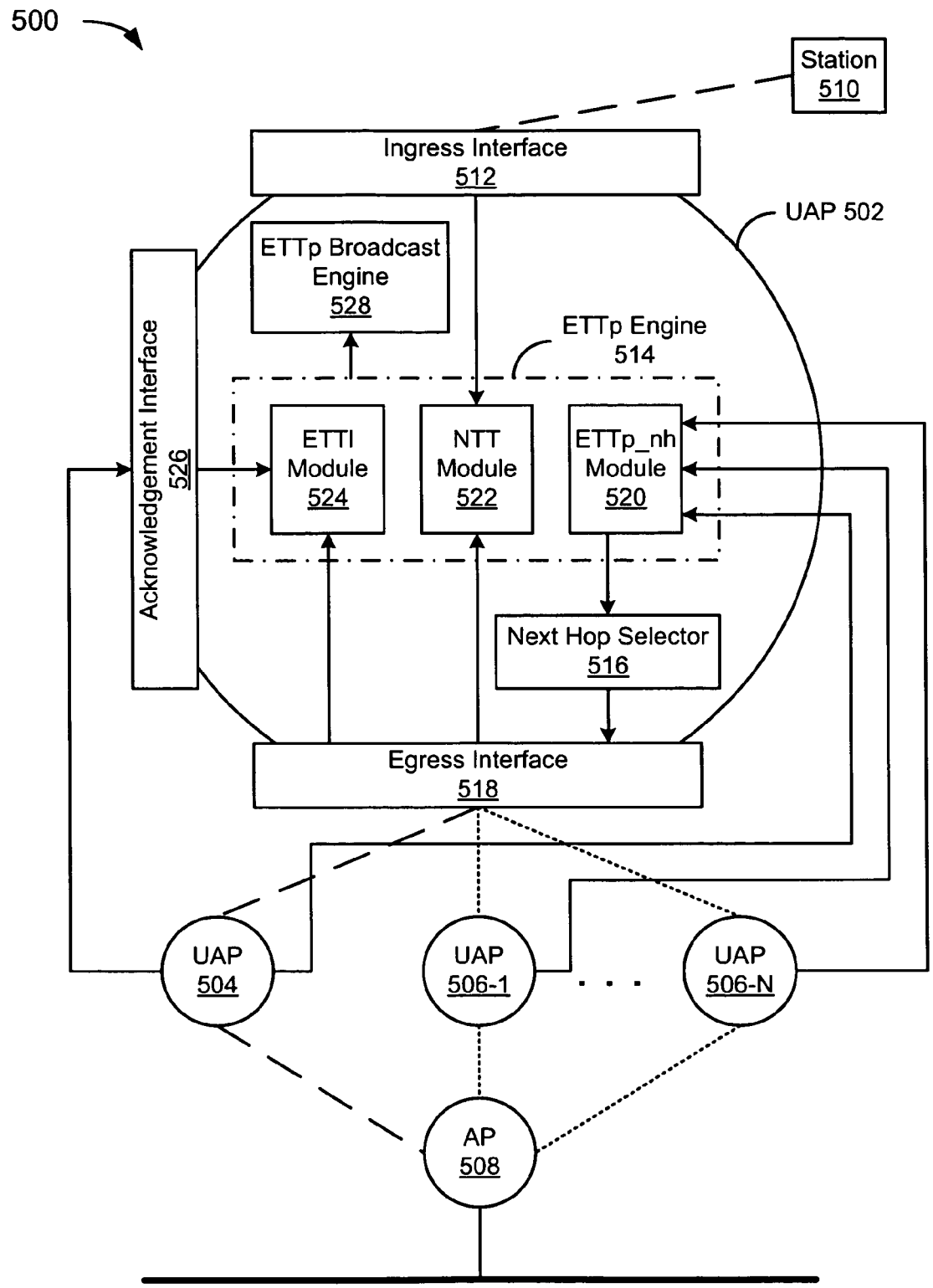
FIG. 5 depicts an example of a wireless network system that includes a plurality of untethered APs (UAPs).

FIG. 5 depicts an example of a wireless network system 500 that includes a plurality of untethered APs (UAPs). In the example of FIG. 5, the system 500 includes a UAP 502, a UAP 504, a plurality of UAPs 506-1 to 506-N (referred to collectively as UAPs 506), and an AP 508. For illustrative purposes only, a path for wireless traffic from a station 510 to the AP 508 is depicted as a dashed line. Potential paths for wireless traffic from the station 510 to the AP 508 are depicted as dotted lines.

In the example of FIG. 5, wireless traffic from the station 510 is directed to an AP with which the station 510 has associated. Typically, though not always, the AP with which the station associates is the one that is closest to the station 510 (or the one that detects the highest RSSI from the station 510). In the example of FIG. 5, the closest station is presumed to be the UAP 502.

In the example of FIG. 5, presumably, at some stage it was determined that the best path from the station 510 to the AP 508 was from the USP 502 to the UAP 504 and finally to the AP 508. However, the system 500 continuously or occasionally measures ETT for various nodes, as was described above. Thus, it may be determined that a different path (through one of the UAPs 506) is better. It should be noted that, depending upon the implementation and/or embodiment, a tethered AP could be rejected as a next hop in favor of a UAP, followed by an eventual hop to some other AP. This would be the case if ETTp from the UAP was better than the ETTp directly to the tethered AP. Presumably, this would be unusual, but not impossible.

At the UAP 502, the goal is to send traffic to the least expensive AP that is wired to a network. By least expensive, what is intended is that a weighted graph with edges that are ETT between nodes, would yield the smallest result possible (or practical). This AP may or may not be the AP closest to the UAP 502. The UAP 502, for illustrative purposes, is illustrated as a large circle with various components. However, the UAP 504, the UAPs 506, and/or the AP 508 may have similar components (not shown).

In the example of FIG. 5, the UAP 502 includes an ingress interface 512, an ETTp engine 514, a next hop selector 516, and an egress interface 518. The ETTp engine 514 includes an ETTp_nh module 520, an NTT module 522, and an ETTl module 524. In operation, in a non-limiting embodiment, the UAP 504 and the UAPs 506 have broadcast advertised ETTp values that are associated with the path from the respective nodes to a destination, such as the wired network. The ETTp_nh module 520 receives each of the advertised ETTps.

Some time later (or concurrently) the station 510 sends packets to the UAP 502, which are received at the ingress interface 512. The NTT module 522 receives an indication, such as a first timestamp, that a first packet has been received. As much as is practical, it would probably be valuable to have the timestamp represent the exact time the first packet was received at the ingress queue 512, though an estimate may be used. At this point, the ETTp engine 514 knows only ETTp values for the UAP 504 and UAPs 506, but has no link information. It should be noted that in practice there will typically be link information as described later. Nevertheless, assuming for a moment that no link information is available, the ETTp engine 514 can provide the advertised ETTp values to the next hop selector 516, which picks an appropriate optimal path to the destination based on the advertised ETTp values. Specifically, the next hop selector 516 chooses the shortest (e.g., lowest weight) path to the destination.

The first packet is enqueued at the egress interface 518, as appropriate. It may be noted that the first packet may or may not need to be enqueued in a case where the relevant link is underutilized (or saturated but not congested). In any case, when the first packet is received at the egress interface 518, the NTT module 522 receives an indication, such as a second timestamp, that the first packet has been received at the egress interface 518. At this point, the NTT module 522, by comparing, for example, a first timestamp and a second timestamp, can calculate the amount of time that the first packet spent at the UAP 502. This information is useful for purposes that are described below.

The first packet is sent from the egress interface 518 to the UAP 504. For illustrative purposes, it is assumed that the UAP 504 is the next hop in an optimal path. In a non-limiting embodiment, the UAP 504 sends an acknowledgement, as soon as the first packet is received, that the first packet was received. The acknowledgement is received at an acknowledgement interface 526. It should be noted that the acknowledgement interface 526 may be part of a radio interface that includes the ingress interface 512 (or even the egress interface 518). In any case, the acknowledgement interface 526 provides the ETTl module 524 with an indication, such as a timestamp, that an acknowledgement was received from the next hop node. The ETTl module 524 uses the indication (e.g., second timestamp) that was generated when the first packet was enqueued on the egress interface 518 and the indication (e.g., third timestamp) that was generated upon receipt of the acknowledgement to provide an ETTl value.

At this point, the ETTp engine 514 has enough information to know ETTp from the UAP 502 to the destination. Specifically, ETTl+NTT+ETTp_nh=ETTp from the UAP 502 to the destination. This ETTp value can be provided to an ETTp broadcast engine 528. In the example of FIG. 5, the broadcast engine 528 is not providing any value to the station 510 (unless the station 510 includes a means for making use of the broadcast ETTp). However, the UAP 504, for example, may have a broadcast engine that functions similarly. Such an engine could be used to provide the advertised ETTp to the ETTp_nh module 520, as described previously.

Figure 6:
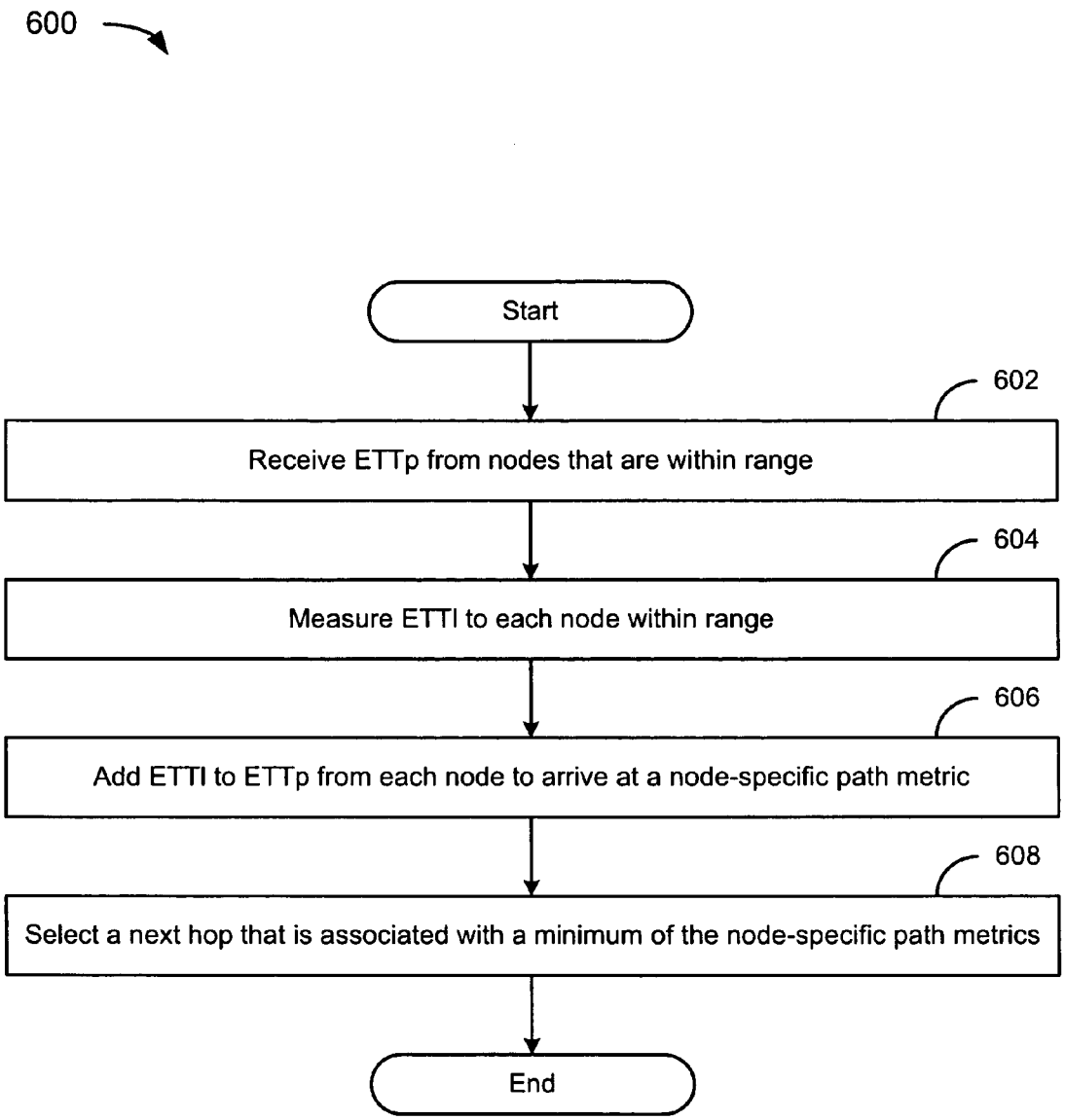
FIG. 6 depicts a flowchart of an example of a method for selecting a next hop.

FIG. 6 depicts a flowchart 600 of an example of a method for selecting a next hop. In the example of FIG. 6, the flowchart 600 starts at module 602 where ETTp is received from nodes that are within range. In an embodiment, the node at which a next hop is being selected listens for any node within range. In an alternative, the potential next hop nodes may be restricted in some manner.

In the example of FIG. 6, the flowchart 600 continues to module 604 where ETTl is measured to each node within range. Since the ETTl is an actual measurement (rather than a guess), the ETTl is a relatively accurate representation of actual link characteristics. Any applicable known or convenient technique may be used to measure ETTl. An example of a method for measuring ETTl to a node is described later with reference to FIG. 7.

In the example of FIG. 6, the flowchart 600 continues to module 606 where ETTl is added to ETTp from each node to arrive at a node-specific path metric, and to module 608 where a next hop is selected that is associated with a minimum of the node-specific path metrics. Notably, the lowest ETTp plus a corresponding ETTl is not necessarily lower than some other ETTp plus a corresponding ETTl.

Figure 7:
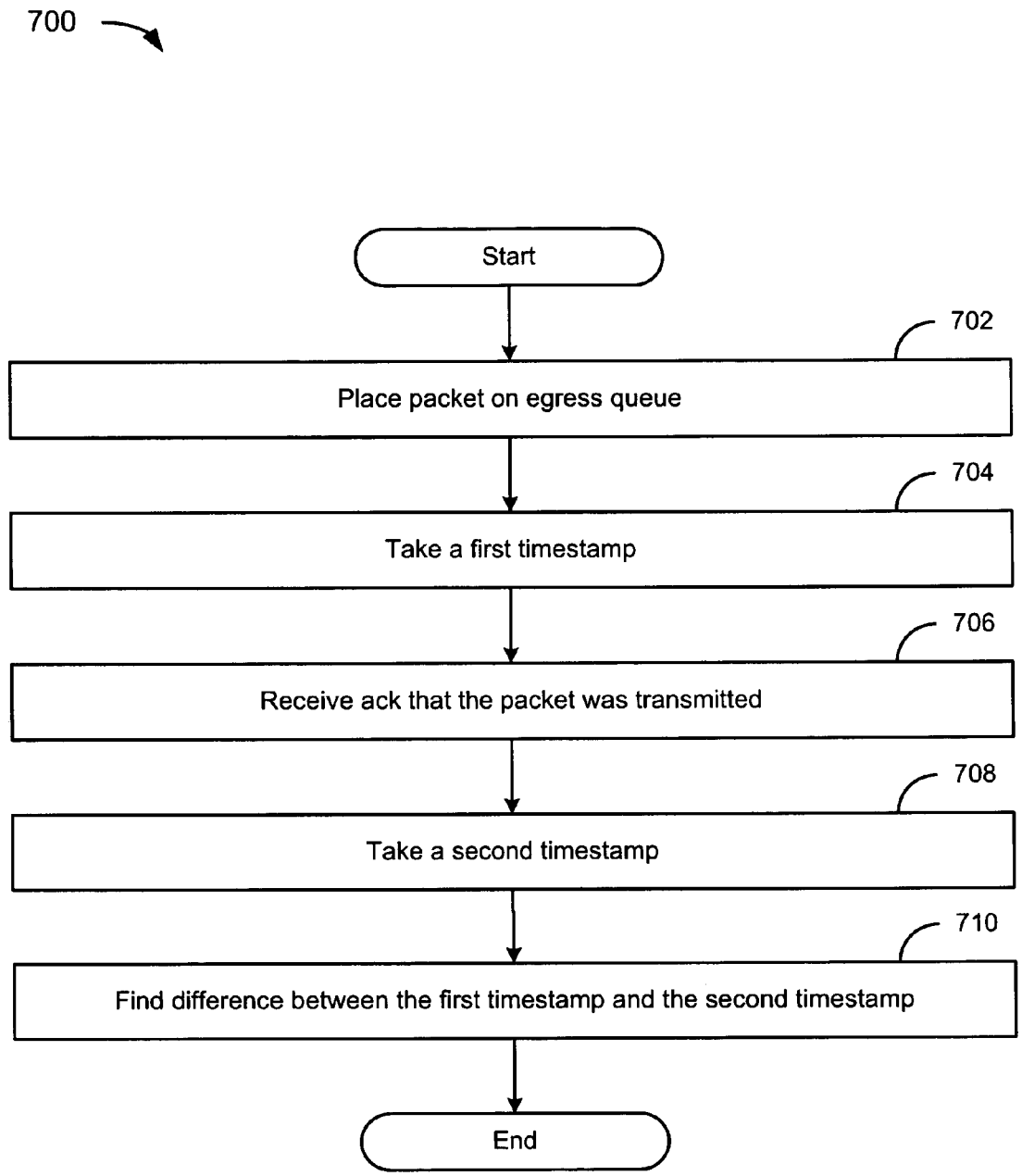
FIG. 7 depicts a flowchart of an example of a method for measuring ETTl to a node.

FIG. 7 depicts a flowchart 700 of an example of a method for measuring ETTl to a node. In the example of FIG. 7, the flowchart 700 starts at module 702 where a packet is placed on an egress queue. Packets are placed on egress queues when they are ready to be transmitted to a next hop or destination.

In the example of FIG. 7, the flowchart 700 continues to modules 704 where a first timestamp is taken. The first timestamp represents the approximate time at which the packet was placed on the egress queue. The packets may be left on an egress queue for a relatively long time if they are enqueued at a faster rate than they are dequeued (and transmitted). Typically, if a packet remains in the egress queue for a relatively long period of time, a link between the current queue and the next hop or destination is congested.

In the example of FIG. 7, the flowchart 700 continues to module 706 where an acknowledgement is received that the packet was transmitted. The acknowledgement may be in the form of, by way of example but not limitation, an 802.11 ack. Other protocols may have other techniques or terminologies, but any applicable known or convenient means for acknowledging that the packet was received may be used, depending upon the implementation and/or embodiment.

In the example of FIG. 7, the flowchart 700 continues to module 708 where a second timestamp is taken. The second timestamp represents the approximate time at which the packet that was placed on the egress queue, plus the time to reach the next hop, plus the time to receive the acknowledgement (which is normally sent immediately upon receipt of the packet). Alternatively, the second timestamp could be placed in the acknowledgement such that the time to receive the acknowledgement is omitted.

In the example of FIG. 7, the flowchart 700 continues to module 710 where a difference between the first timestamp and the second timestamp is found. In a non-limiting embodiment, this entails calculating an exponentially decaying average of the difference. In any case, the value found may be used as an ETTl.

Figure 8:
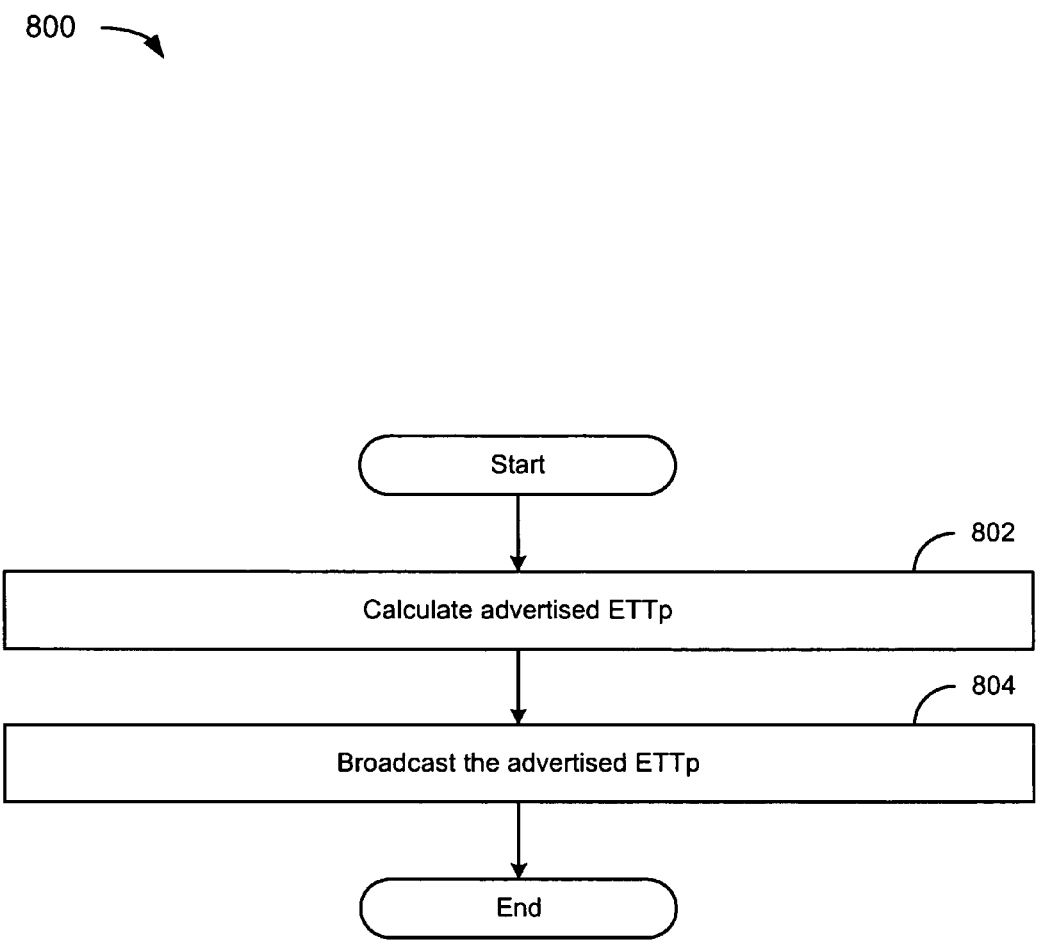
FIG. 8 depicts a flowchart of an example of a method for advertising an ETTp.

FIG. 8 depicts a flowchart 800 of an example of a method for advertising an ETTp. In the example of FIG. 8, the flowchart 800 starts at module 802 where an advertised ETTp is calculated. ETTp is calculated by selecting an advertised ETTp from some other node and adding local NTT. NTT may be, by way of example but not limitation, an exponentially weighted average of the time it takes to transmit a packet from an ingress to an egress queue in a node. An example of a method for calculating NTT is described later with reference to FIG. 9.

In the example of FIG. 8, the flowchart 800 continues to module 804 where the advertised ETTp is broadcast. In an alternative embodiment, the ETTp may be multicast to a subset of nodes within broadcast range. Any nodes within range may use the advertised ETTp when selecting a next hop, if applicable.

Figure 9:
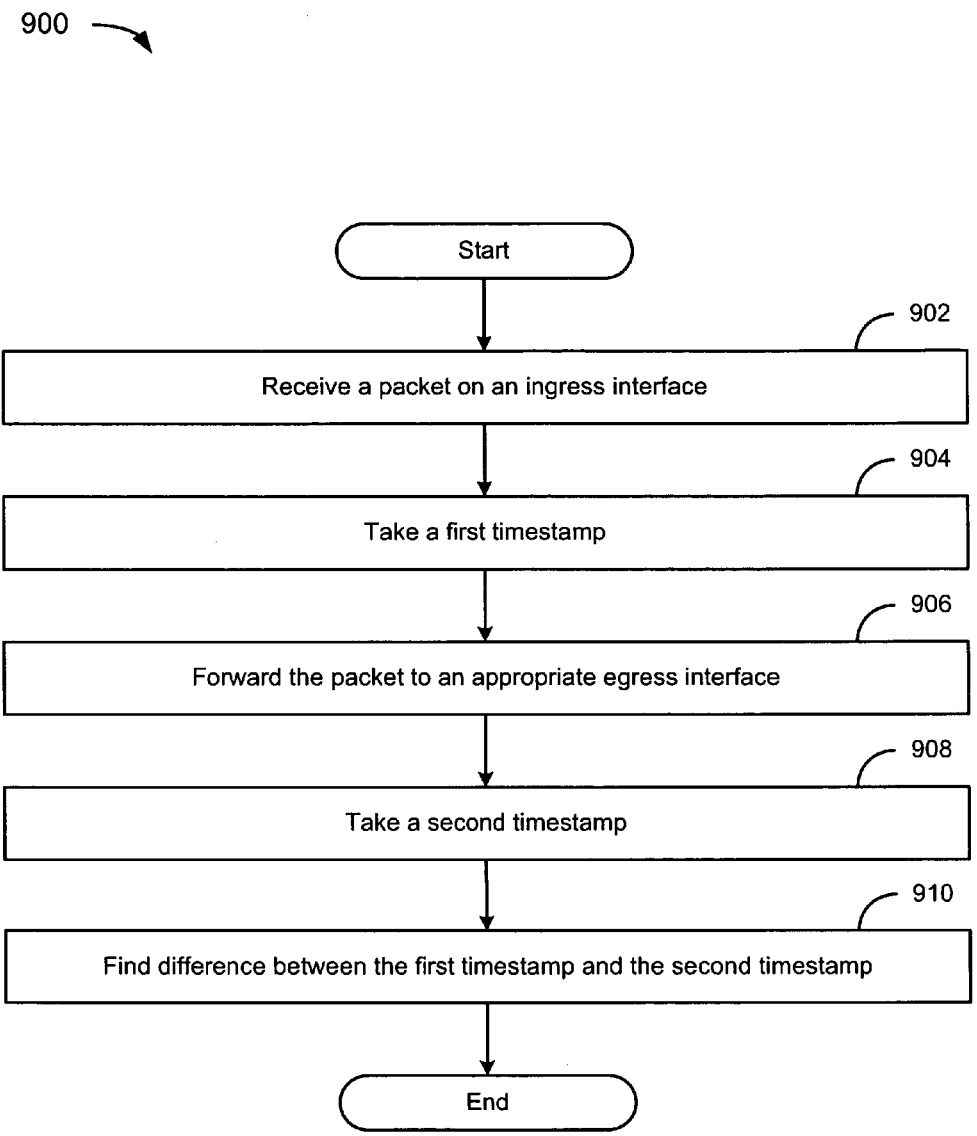
FIG. 9 depicts a flowchart of an example of a method for calculating NTT.

FIG. 9 depicts a flowchart 900 of an example of a method for calculating NTT. In the example of FIG. 9, the flowchart 900 starts at module 902 with receiving a packet on an ingress interface. The packet may be received from a wireless station, such as a mobile device or UAP.

In the example of FIG. 9, the flowchart 900 continues to module 904 where a first timestamp is taken. The first timestamp represents the point in time when the packet is first received at the node.

In the example of FIG. 9, the flowchart 900 continues to module 906 where the packet is forwarded to an appropriate egress interface. Techniques for forwarding packets to egress interfaces are well known in the relevant art, and are not described herein. It is assumed that some applicable known or convenient technique is used.

In the example of FIG. 9, the flowchart 900 continues to module 908 where a second timestamp is taken. The second timestamp represents the point in time when the packet has been enqueued for sending to a next hop or destination.

In the example of FIG. 9, the flowchart 900 continues to module 910 where a difference between the first timestamp and the second timestamp is found. In a non-limiting embodiment, an exponentially decaying average is used. In any case, the derived value may be used as the local NTT.

As used herein, access point (AP) refers to receiving points for any known or convenient wireless access technology. Specifically, the term AP is not intended to be limited to 802.11 APs.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and techniques described herein also relate to apparatus for performing the algorithms and techniques. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method comprising:
    receiving, at a current wireless node, an estimated transmission time (ETT) from each of a plurality of other wireless nodes that are within a range of the current wireless node, wherein each said ETT is a next-hop-to-destination-path ETT (ETTp) associated with one of said other wireless nodes, wherein each said ETTp is a function of a link ETT (ETTl), another ETTp and a node transition time (NTT) of one of said other wireless nodes;
    at the current wireless node, measuring for each of said other wireless nodes an ETTl between the current wireless node and a corresponding one of said other wireless nodes;
    at the current wireless node, adding for each of said other wireless nodes an ETTl to a corresponding ETTp to determine a node-specific path metric for a corresponding one of said other wireless nodes;
    at the current wireless node, selecting a next hop based on the determined node-specific path metrics;
    at the current wireless node, calculating an advertised ETTp for the current wireless node, based on at least one of the measured ETTl's, a corresponding at least one of the received ETTp's and a calculated NTT for the current wireless node; and
    broadcasting the advertised ETTp from the current wireless node to a second wireless node.

2. The method of claim 1, wherein measuring an ETTl comprises:
    placing a packet on an egress queue;
    taking a first timestamp;
    receiving acknowledgement that the packet was transmitted;
    taking a second timestamp;
    finding the difference between the first timestamp and the second timestamp.

3. The method of claim 2, wherein finding the difference between the first timestamp and the second timestamp includes taking an exponentially decaying average.

4. The method of claim 1, wherein the calculating the advertised ETTp comprises:
    receiving a packet on an ingress interface;
    taking a first timestamp;
    forwarding the packet to an appropriate egress interface;
    taking a second timestamp;
    finding the difference between the first timestamp and the second timestamp.

5. The method of claim 4, wherein finding the difference between the first timestamp and the second timestamp includes taking an exponentially decaying average.

* * * * *